(12) United States Patent
Dawson et al.

(10) Patent No.: US 9,700,804 B2
(45) Date of Patent: *Jul. 11, 2017

(54) METHOD AND SYSTEM FOR ACCURATE RATING OF AVATARS IN A VIRTUAL ENVIRONMENT

(75) Inventors: Christopher J. Dawson, Bethesda, MD (US); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

This patent is subject to a terminal disclaimer.

(21) Appl. No.: 12/568,971

(22) Filed: Sep. 29, 2009

(65) Prior Publication Data

US 2011/0078088 A1 Mar. 31, 2011

(51) Int. Cl.
  *G06Q 30/02* (2012.01)
  *A63F 13/798* (2014.01)
  *G06Q 50/00* (2012.01)

(52) U.S. Cl.
  CPC ........... *A63F 13/798* (2014.09); *G06Q 30/02* (2013.01); *G06Q 30/0282* (2013.01); *G06Q 30/0283* (2013.01); *G06Q 50/01* (2013.01); *A63F 2300/5553* (2013.01); *A63F 2300/65* (2013.01)

(58) Field of Classification Search
  USPC .......................................... 705/1.1, 318, 319
  See application file for complete search history.

(56) References Cited

U.S. PATENT DOCUMENTS

| | | | |
|---|---|---|---|
| 5,956,039 A | 9/1999 | Woods et al. | |
| 6,029,195 A * | 2/2000 | Herz | G06F 17/30867 |
| | | | 348/E7.056 |
| 6,329,986 B1 | 12/2001 | Cheng | |
| 6,545,682 B1 | 4/2003 | Ventrella et al. | |
| 7,567,977 B1 * | 7/2009 | White | G06Q 10/10 |
| 7,930,255 B2 * | 4/2011 | Choi et al. | 705/319 |
| 8,060,405 B1 * | 11/2011 | Lawrence | G06Q 30/02 |
| | | | 705/14.54 |

(Continued)

OTHER PUBLICATIONS

Selvarajah et al.; "The Use of Emotions to Create Believable Agents in a Virtual Environment"; AAMAS'05, Jul. 25-29, 2005, Utrecht, Netherlands; pp. 13-20.

(Continued)

*Primary Examiner* — Mark A Fleischer
(74) *Attorney, Agent, or Firm* — Whitham, Curtis & Cook, PC; Maeve M. Carpenter (57) ABSTRACT

A method and system applies a rating adjustment to ratings by avatars in a virtual universe. The rating adjustment offsets mutual rating collusion between avatars. The ratings may be adjusted based on a weighted value of indicia of association, and may also be adjusted based on rating frequencies between the same avatars. In a rating system having a fee structure, the ratings may be adjusted by scaling the rating/fee payoff to favor higher fees. Where indicia of association are weighted, the weightings are mapped to discrete levels of association between avatars, from no association to close association, with greater reduction of ratings for closer association.

22 Claims, 5 Drawing Sheets (56) References Cited

U.S. PATENT DOCUMENTS

| | | | |
|---|---|---|---|
| 2006/0009994 A1* | 1/2006 | Hogg | G06Q 50/01 |
| | | | 705/319 |
| 2008/0243631 A1* | 10/2008 | Kane | G06F 17/3089 |
| | | | 705/14.5 |
| 2009/0240629 A1* | 9/2009 | Xie et al. | 705/80 |
| 2010/0164947 A1* | 7/2010 | Bolger | G06T 13/40 |
| | | | 345/419 |
| 2010/0250605 A1* | 9/2010 | Pamu et al. | 707/783 |
| 2010/0273546 A1* | 10/2010 | Lior et al. | 463/13 |
| 2011/0055104 A1* | 3/2011 | Sun | G06Q 10/10 |
| | | | 705/347 |

OTHER PUBLICATIONS

Jackson et al.; "Collaboration and Learning Within Immersive Virtual Reality"; CVE 2000, San Francisco, CA; pp. 83-92.

Maldonado et al.; "We Learn Better Together: Enhancing e-Learning with Emotional Characters"; Computer Supportive Collaborative Learning: The Next Ten Years, Proceedings of the Sixth International Computer Supported Collaborative Learning Conference (CSCL 2005), pp. 408-417.

Zanbaka et al.; "Can a Virtual Cat Persuade You? The Role of Gender and Realism in Speaker Persuasiveness", CHI 2006 Proceedings, Beliefs and Affect: Apr. 22-27, 2006; Montreal, Quebec, Canada; pp. 1153-1162.

Bailenson et al.; "Interaction in Collaborative Virtual Environments"; Presence, vol. 15, No. 6; Dec. 2006; pp. 699-716.

* cited by examiner

METHOD AND SYSTEM FOR ACCURATE RATING OF AVATARS IN A VIRTUAL ENVIRONMENT

CROSS-REVERENCE TO RELATED APPLICATIONS

This invention is related to previous inventions by the same inventors entitled "DISCERNING AND DISPLAYING RELATIONSHIPS BETWEEN AVATARS," U.S. patent application Ser. No. 12/179,530, filed Jul. 24, 2008, and "FRAUD MITIGATION THROUGH AVATAR IDENTITY DETERMINATION," U.S. patent application Ser. No. 12/045,757, filed Mar. 11, 2008, whose content is incorporated herein by reference.

FIELD OF THE INVENTION

The present invention generally relates to the production and management of interactive virtual universes presented to users on computers linked by a network and, more particularly, to methods and systems for administration ratings by one Avatar of another Avatar.

BACKGROUND OF THE INVENTION

Closely following the introduction of computer generated graphic representations of objects, computer games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments and the rules which govern them may be changed, and these changes may be executed dynamically.

Computers connected through networks such as the Internet have also allowed numerous participants to interact among themselves in the same game. As this multi-player game capability is synthesized with other Internet capabilities such as interactive chat rooms, advertising and marketing techniques, access to massive amounts of information; and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of Avatars. An Avatar, in the context of a VU, is a graphical representation of a user. The appearance and movement of the Avatar is freely selectable and controllable by the user, and other participants can see the Avatar. The Avatar often takes the form of a cartoon-like human which can move through the regions of the virtual universe. These regions are generated in three dimensional (3D) landscapes and populated by 3D objects, including Avatars. The landscapes and objects shown in the virtual universe may or may not resemble the real world familiar to us, in terms of buildings and other constructed objects within the environment, geography, landscapes and the laws which govern the universe.

Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof.

In short, an Avatar controlled by a resident can interact with other Avatars, objects and portions of the immediate environment of the Avatar in much the same way a person would interact with other persons, objects and portions of the environment in the real world and objects and local environments within the VU may be developed creatively to resemble the real world closely, not at all or with any degree of realism or fantasy in between. These combinations of virtual structures may be provided by the administrator of the VU or users of the VU, often for a not insubstantial fee.

Trust is a valuable asset in a collaborative setting, and Avatar rating systems have been developed to enable trust between Avatars. However, there is evidence of collusion between Avatars for the purpose of artificially enhancing ratings. In order to discourage such behavior some virtual worlds impose a fee to provide a rating. However, this pricing policy also limits the willingness of the participants to provide ratings, because they may have insufficient VU funds. Accordingly, there exists a need in the art to overcome the foregoing deficiencies and limitations in Avatar ratings.

SUMMARY OF THE INVENTION

This invention describes methods of more accurately determining an Avatar's social and professional ratings in a neutral manner. The invention capitalizes upon the unique nature of 3D environments, and takes into account the sources of an Avatar's rating, the social and work associations between the Avatar being rated and the Avatar providing the rating, and costs associated with such ratings.

The invention applies new logic to existing Avatar rating systems such that a more accurate and neutral rating for the Avatar is obtained. Such ratings will then be trusted more, leading to improved operation of the virtual universe. Improved reliability of the Avatar trust factor is particularly important with the emergence of commerce in virtual worlds. Additionally, the improved rating system enabled by application of the invention allows for rating of Avatars between virtual worlds or domains.

An aspect of the invention is a computer implemented method for improving accuracy of avatar ratings in a virtual universe, where the computer identifies a rating given by one avatar to another avatar; determines a rating adjustment, the rating adjustment offsetting mutual rating collusion between the avatars; and applies the rating adjustment to the given rating. In a further aspect, determining a rating adjustment is accomplished by measuring a level of association between said avatars, higher levels of association being indicative of higher levels of collusion; and establishing a rating adjustment that reduces a value of the given rating, the reduction being greater for higher levels of association.

Another aspect of the invention accomplishes the measuring step by identifying indicia of association between avatars; developing a weighting logic for combining the indicia into a weighted indicia value; and mapping the weighted indicia value to a level of association, a higher weighted indicia value being indicative of a higher level of association. A further aspect of the invention partitions a scale of weighted indicia values into a sequence of value ranges, each of the partitions being mapped to a level of association, the levels of association being arranged in a corresponding sequence. Yet another aspect of the invention defines the sequence of levels of association as the set: closely associated; moderately associated; loosely associated; and not associated.

It is also an aspect of the invention to include in the rating adjustment determination step a rating fee schedule, lower fees for making ratings corresponding to lower fractional values of the rating adjustment. In addition, the fractional value rating adjustments may be further reduced for shorter delays between the rating and a prior rating between the avatars, the shorter the delay the greater the reduction. Another aspect of the invention combines, in a single rating adjustment algorithm, rating adjustment components based on a level of association between Avatars, a weighting factor responsive to fees charged for ratings, and a weighting factor responsive to a measure of time between rating events between the same Avatars.

A further aspect of the invention implements the above described method as a computer implemented system having means for accomplishing each step in the method. Yet another aspect of the invention is an implementation of the invention as a service on a server having software modules for performing each of the means identified in the system.

It is also an aspect of the invention to provide an avatar rating accuracy improvement service implemented by computer, comprising a database for storing ratings given by one avatar to another avatar; a software module for determining a rating adjustment, the rating adjustment offsetting mutual rating collusion between said avatars, the software module further comprising computer code for measuring a level of association between said avatars, higher levels of association being indicative of higher levels of collusion, and computer code for establishing a rating adjustment that reduces a value of the given rating, the reduction being greater for higher levels of association; and means for applying the rating adjustment to the given rating.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Avatars in virtual worlds can have a wide range of business and social experiences, and such experiences are becoming more important as business and social transactions are becoming common in virtual worlds such as Second Life®. In fact, the characteristics of an Avatar play important social, business, and other related roles in these virtual worlds. Second Life® is a privately owned 3-D virtual world, made publicly available by Linden Research, Inc. The Second Life® virtual world is computed and managed by a large array of servers that are owned and maintained by Linden Research, Inc. The Second Life® client program provides its users (referred to as residents) with tools to view, navigate, and modify the Second Life® world and participate in its virtual economy. Second Life® over 1 million residents. Social and business interactions are important in Second Life®, and these interactions include resident interactions in meetings both inside and outside of commercial environments.

Furthermore, because of the computer implementation, an Avatar may be transported from one portion of the VU directly to another (a process referred to as "teleporting") nearly instantaneously, due allowance being made for latency between a movement decision and the rendering of that movement in the respective portions of the VU. This attribute of direct movement within a VU enables the resident to avoid both the time and expense of traversing the "space" between one VU portion and another, as would be necessary in a non-virtual environment. But it also complicates the task of knowing and trusting another Avatar who may appear or disappear suddenly; without the expected entry and departure queues.

Virtual Worlds and Universes (terms used interchangeably here and summarized by the acronym "VU") present a tremendous new outlet for both structured and unstructured forms of virtual collaboration. Furthermore, the term "virtual" is not to be understood as distinct from the term "real world" but rather as a computer implemented set of structures and processes representing structures and processes of the conventional "real world" and operable for monitoring and activating these structures and processes, and for serving as surrogate structures and processes that, in practical effect, extend the collaborative opportunities of the conventional "real world." A virtual world can be populated by Avatars, each of which is a virtual representations of the person controlling the Avatar, and where "real world" entities, including commercial and regulatory entities, can be represented by suitable structures and processes (including Avatars) controlled by these entities. Indeed, there is an emerging recognition that the structures and processes of virtual worlds may be used to enhance the structures and processes of the conventional "real world."

Effective collaboration and effective collaborative relationships depend upon trust among those who participate in the collaboration, whether the collaboration is in a "real" or a "virtual" world. A high level of trust is a valuable asset in such collaborations. Because the real identity of the person controlling a virtual world Avatar may not be known, the development and maintenance of sufficient trust to support the collaboration becomes an issue. In order to resolve this issue, Avatar rating systems have been developed. As an example, in the Second Life virtual world each Avatar can be rated on the following characteristics: behavior (how the Avatar behaves in Second Life); appearance (how the Avatar looks); building (buildings or objects created by the Avatar); and "given" (how many ratings the Avatar has given others), among others.

Each time an Avatar is rated in a category the new rating is combined with the existing ratings, typically to produce an average. A count is retained of the number of ratings, both given and received. This number is typically expressed as rating "points" given and rating "points" received. The rating scale used in a particular virtual universe may be adapted to suit the purposes of those who have designed the universe. The ratings applied are, of course, dependent upon the judgment (and bias) of the person whose Avatar is providing the rating. It may be assumed, for example, that an Avatar with a high behavior rating (e.g. 10 on scale of 1 to 10) is to be trusted more than an Avatar with no rating, or with a lower rating. However, the value of this rating is problematic when Avatars mutually agree to rate each other positively.

This phenomenon has been tested. In a very large number of cases where Avatar ratings were reviewed in Second Life®, the Avatar was found to have the exact same number of received rating points as those points given. This suggests that collusion ("you rate me high and I will rate you high") to obtain high ratings is a widespread phenomenon. This problem is exacerbated when a single individual controls multiple Avatars and has them rate each other.

Figure 1:
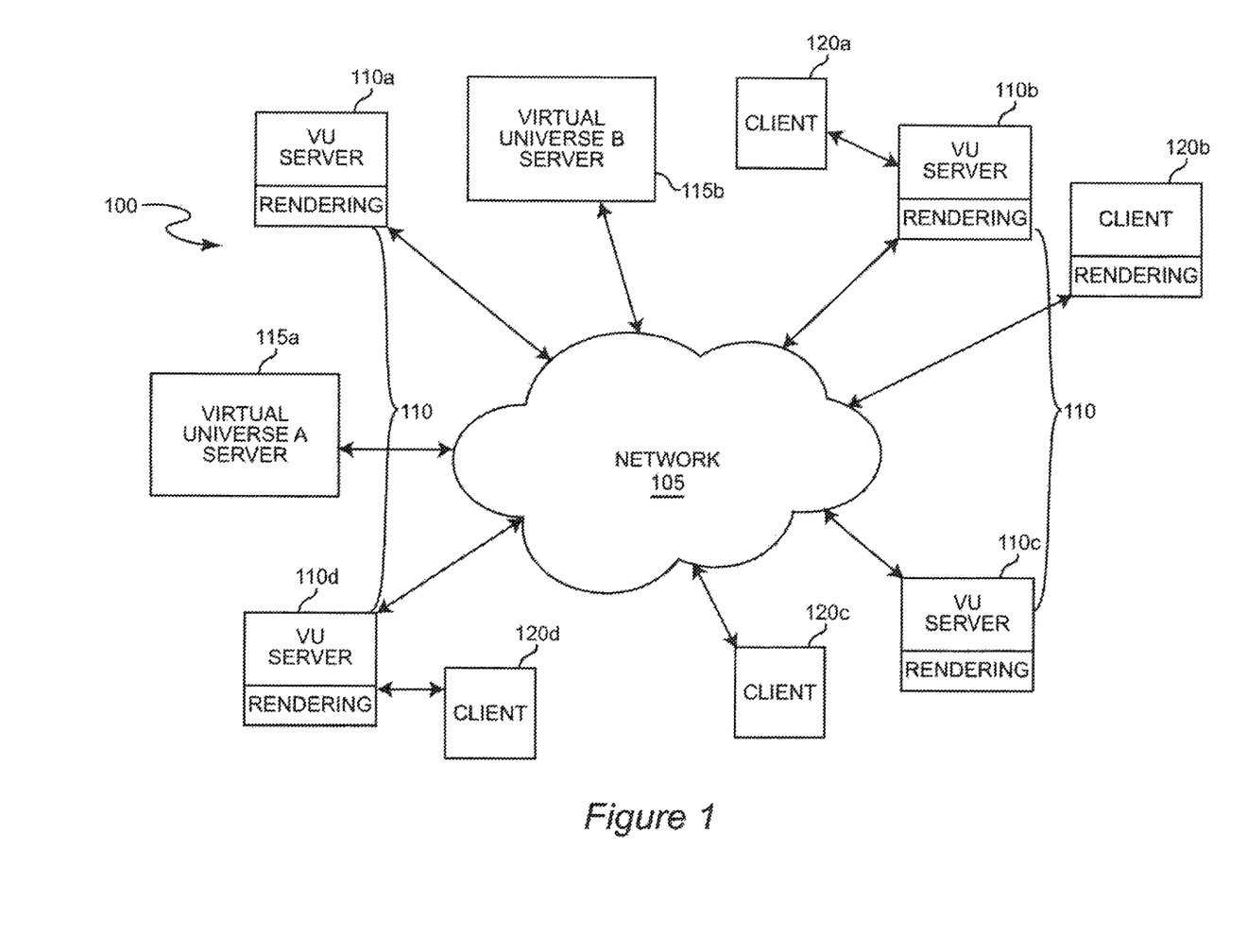
FIG. 1 is a high-level block diagram or data flow diagram of a network-based virtual universe.
Figure 2:
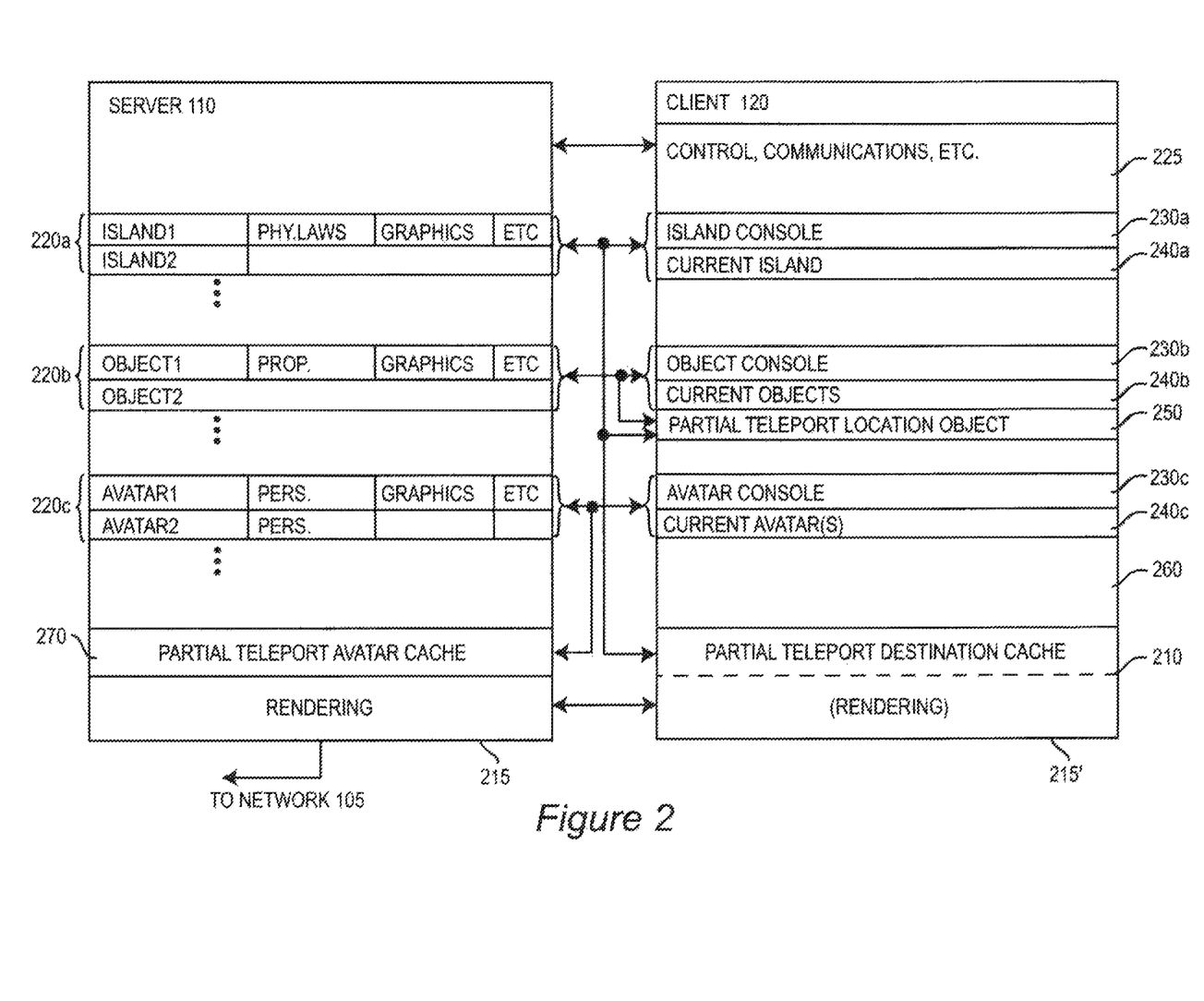
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIGS. 1 and 2, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructures.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as Avatars are manipulated and as teleportation between islands of the VU occur. Further, substantial portions of the control of Avatars must be automated in order to keep the manipulation effort required of a resident within reasonable bounds while providing meaningful and reasonably logical and realistic interactions with environments, objects and other Avatars. Thus, each environment/island, object and Avatar must be individualized with attributes (e.g. behavioral traits, behavior characteristics, and other properties, including ownership and the like), and these attributes must be transmitted efficiently, generally as metadata, between potentially a large number of processors which perform the rendering thereof and the terminals through which residents interact with the VU and to which rendering is distributed in some form.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115a,b which establishes the basic VU topology, characteristics, rules and the like and maintains membership and billing information in regard to residents (users). Clients 120a-120d are essentially user terminals and may communicate with the network 105 and virtual universe servers 115a,b either directly or through a VU server although that distinction, as well as the presence of functional elements mentioned above, is unimportant to the practice of the invention.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden.

As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of the rendering is generally resident in each VU server 110 and the virtual universe servers 115a,b of FIG. 1 but may be present to some degree (e.g. a graphics co-processor) at a client terminal 120a,b,c,d as depicted by dashed line 210 and parentheses in FIG. 2. In general, the servers 110, 115a,b will have the capability of arbitrating the most convenient/available location for the portion of the rendering performed on a server to be done most expeditiously. For example, when a rendering of a scene is required at, say, client 120a for interaction of a particular avatar with an object while changing location on an island, the rendering (including occlusion or hidden line processing) could be performed at the client, local server 110b or distributed over any or all of servers 110a-110d and possibly even including some client terminals (e.g. 120b) having rendering capability depending on rendering complexity (e.g. required image detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or individual, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that clients 120a,b,c,d each will have appropriate controls and communications facilities (which are not generally hardware-dependent but can use available hardware interfaces such as a keyboard, mouse, camera, microphone or the like) collectively depicted at 225 of FIG. 2 which will preferably he resident on the client processor. In order to create islands, objects and Avatars, some arrangement for doing so may also be resident on the client processor, preferably downloaded from virtual universe server 115 through the local server. The arrangement for this creation is preferably a graphical user interface (GUI), which may be in the form of one or more screens (possibly nested) functioning as a console 230a-230c. Such consoles allow particular attributes (e.g. locations, properties, behavioral patterns, graphics definitions and the like) to be specified and which are thereafter stored, preferably on an associated server 110 as depicted at 220a, 220b and 220c for islands, objects and avatars, respectively. After being specified they are then stored, preferably on an associated server 110 (e.g. 110a-110d). Similar GUIs 240a-240c are also provided (but preferably are resident on the client processor) for control of the current island, object and/or Avatar, once it has been created.

Suitable arrangements for providing GUIs or consoles 230a-230c and control GUIs 240a-240c are known and others providing enhanced user/resident convenience are foreseeable. The current island (220a) with its associated objects (220b) correspond to the current location of the current avatar (220c) and are thus the object of teleportation or relocation invitations to which the present invention is directed for management thereof. While the creation and control GUIs may be thought of as implemented through distinct and respective screens (or sets of nested screens), this structure is merely exemplary of a structure operable to provide a reasonable convenience and ease of use to the user. Those skilled in the art will appreciate that a user experienced with a particular VU may experience enhanced convenience and ease of use through a GUT that provides, for example, templates or other mechanisms that reduce of eliminate unnecessary or repetitive keystrokes or mouse clicks. For the purposes of clarity in describing the invention, however, the distinct functional screen set implementation described above in connection with FIG. 2 will be used.

Some definitions which will be helpful in the following discussion are:
1. Avatar—an Avatar is a graphical representation the user/resident selects that others can see, often taking the form of a cartoon-like human but which can be produced with any degree of detail, whether real or fanciful;
2. Agent—an agent is the user's account, upon which the user/resident can build an Avatar and which is tied to an inventory of assets the user creates and/or owns;
3. Region—a region is a virtual area of land (e.g. a portion of an island or an environment associated therewith, such as an interior space in a building) within the virtual universe which typically resides on a single server;
4. Landmarks—a landmark is a map location that can be saved by a user and typically comprises a name and a map coordinate within the VU;
5. Friend/contact—a friend or contact is another user/resident of the VU which is maintained in one or more lists which allows a user to see when friends or prior contacts are online and provides a mechanism for contacting them directly using tools available with the list.

It should also be appreciated that assets, Avatars, the environment corresponding to a location and anything else visible in the virtual environment comprises Universally Unique IDentifiers (UUIDs) tied to geometric data (preferably distributed to users as textual coordinates), textures (preferably distributed to users as graphics files such as PEG 2000 files) and effects data (preferably rendered by the user's client according to the user's preferences and the user's device capabilities, but could be otherwise rendered as discussed above).

Referring again to FIG. 2, it will be recalled from the foregoing that a client processor 120 through which a resident may participate in a VU will generally have information concerning a current avatar and a current environment as well as objects therein either stored or available from a server local thereto, as generally depicted at GUIs 240a-240c. Similarly a resident's inventory and attribute information, together with information generated by a user avatar while in the VU, will be similarly present or available. This information may include information including but not limited to resident preferences and characteristics, ratings given to other avatars, and any other information particular to the resident or particular to any avatar controlled by the resident. Comparable information for other users and avatars operating in the VU, and other objects present in the VU, will also be available. All this information may be assembled and analyzed in accordance with the procedures described hereafter in connection with FIGS. 3A and 3B to determine levels of association between avatars and to adjust ratings in accordance with the methods described below. As will be appreciated by those skilled in the art, the processing required may be distributed between client and server. The information on the client 120 as well as the processing performed on the client 120 is represented by item 260. Similarly, the information on the server 110 as well as the processing performed on the server (or distributed to other servers in the VU) is collectively represented by item 270.

Methods have been developed by the inventors regarding definition, discovery, and determination of indicia of Avatar-to-Avatar associations, including discovery of the fact that a single user is controlling more than one Avatar. These methods are described in the related patent applications referenced and incorporated by reference above and are being relied upon in the present invention. Using such discovery techniques described in these other inventions, and applying new logic to existing rating systems, this invention provides a more robust, accurate, and trustworthy Avatar rating method and system.

The following attributes of relationships between Avatars are defined for the invention.

Association Relativity (AR):

Closely Associated. These are Avatars that have direct social relationships. Such relationships may be intuited from peers (friend/buddy/contact lists), organizational relationships, frequency of chat and text, common Second Life® regional memberships (e.g. in the same clubs), and other such probative and discernible indicia of connection between Avatars. Additionally, any Avatars that are found to be managed by the same individual user or family would automatically be deemed as closely associated. Ratings between closely associated Avatars should carry less weight than ratings between lesser associated Avatars especially where the closely associated Avatars have exchanged ratings.

Moderately Associated. For these Avatars a significant subset of their relationship indicia will show a connection, but they will not be controlled by the same user or family.

Loosely Associated. These Avatars may be related to one another through one or more association points. However, based on observable interactions with one another as compared to Avatars that are moderately or closely associated, these Avatars are determined to be only loosely associated.

Not Associated. These Avatars have no discernible association based on available data.

The analysis of the degree of association between Avatars depends upon available data, and as the available data grows it is possible that statistical tools may provide correlations useful in applying weights to particular indicia of a relationship, between two Avatars, that has been identified. A metric for levels of association between two Avatars may be a simple series of discrete gradations, as described in the above categories of Association Relativity (AR). Relationship indicia are identified, in light of the discovery mechanisms described in the above referenced related patent applications, and then combined by a suitable weighting logic to produce a weighted value. A scale of weighted values is then developed for mapping particular weighted values to corresponding levels of association between Avatars. A rating adjustment is established for each level of association, and this adjustment is applied to the rating given by one Avatar to another.

As an example, assume ten association indicia are defined in a virtual world, and these are defined in terms of a binary "yes" or "no" answer to the question whether a particular indicia is present or not in the relationship between a pair of Avatars. Examples of these indicia could include: 1) members of the same group; 2) purchased similar goods; 3) spent similar amount of time in a location; 4) outside the virtual world, are physically located near one another (can tell from registration info, or, from IP address); 5) have met and spent time together in the virtual world; 6) have chatted in the virtual world; 7) have exchanged goods with each other in the virtual world; 8) interact with other users with N degrees of separation. All these are examples of possible association indicia.

For simplicity of illustration, assume that ten such indicia are defined in a virtual world, each having a binary "yes" or "no" value for a pair of Avatars. A suitable rating scale might map to the above described four levels of association in the following manner: if a given pair of Avatars satisfy seven or more of these ten indicia, they are deemed to be "closely associated", while a score of three to six may indicate "moderate association", and a score of one or two would indicate "loose association". A score of zero would indicate "no association". This simple mapping assumes that each of the ten indicia is weighted equally, so it is possible to perform an evaluation of the indicia which gives them different relative weights, or even applies weights that reflect more complex relationships between indicia. Such a weighting system could be normalized to map to a rating scale of 1 to 10, whether or not the number of indicia were more or less than ten. Additionally, a formula for such normalized weights may be part of a larger logical algorithm. For example, if one or more of a certain category of indicia are present (e.g. the two Avatars are controlled by the same user, or the two Avatars appear on each other's "friends" list) that may be sufficient to apply a "closely associated" classification.

Figure 3A:
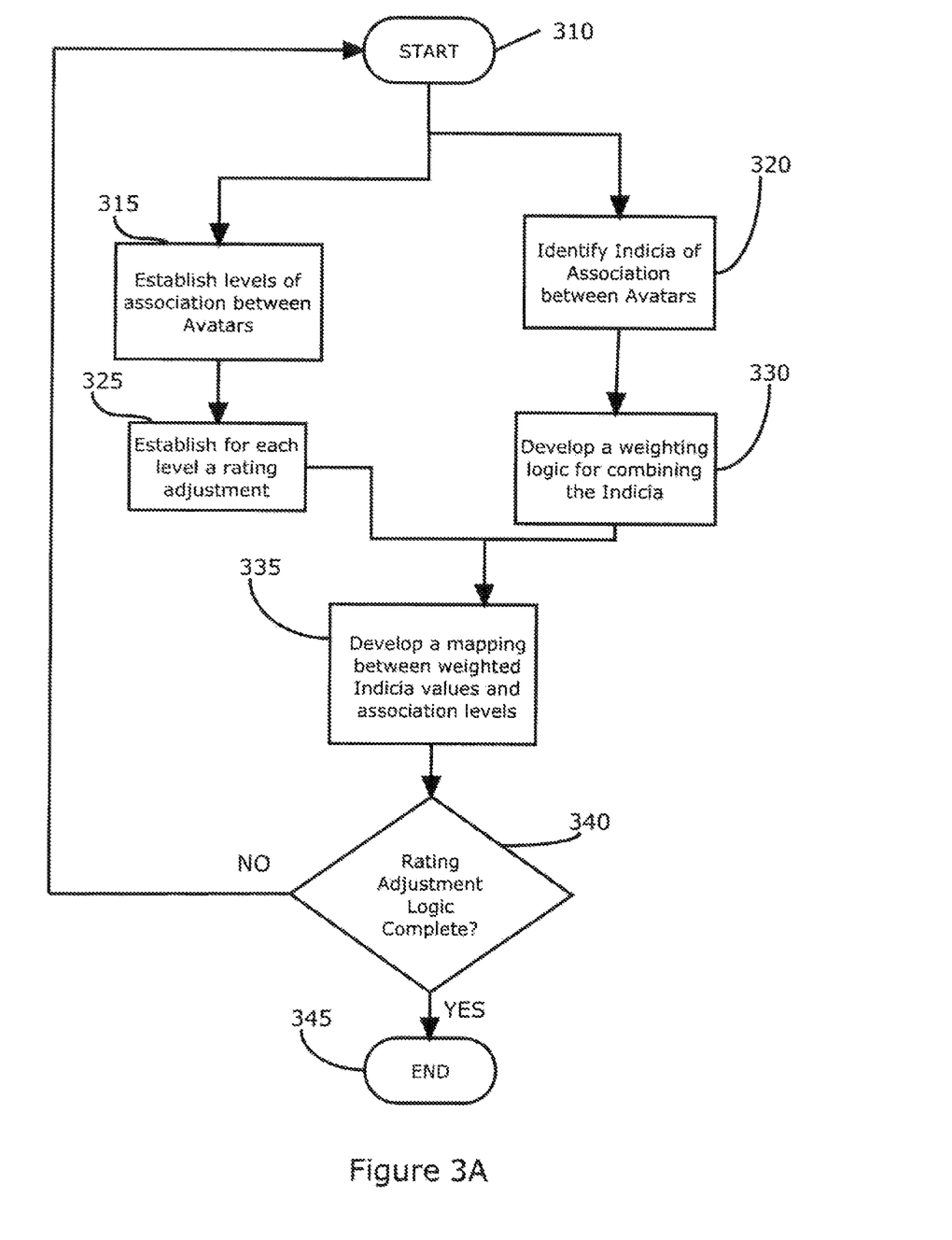
FIG. 3A is a flow chart showing how an avatar rating system is developed.
Figure 3B:
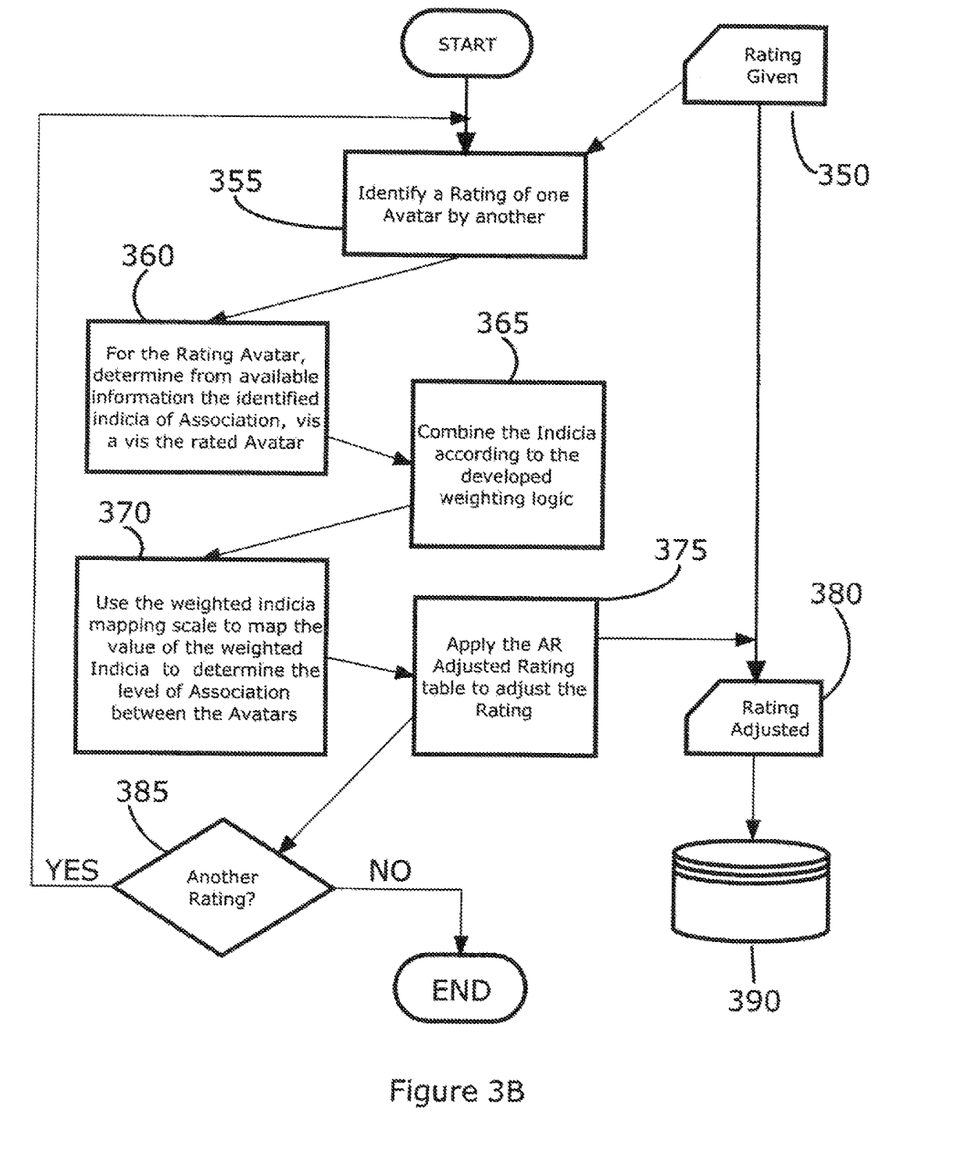
FIG. 3B is a flow chart showing how the rating system is applied to adjust given ratings.

The foregoing logic may be understood by reference to the flowcharts shown in FIGS. 3A and 3B. The process for establishing a rating adjustment table for the level of association between Avatars starts at 310 and branches into two tracks. One series of steps identifies 320 suitable indicia of association between. Avatars (e.g. the ten indicia posited in the above discussion), and then develops 330 a logic for combining the indicia into a weighted value (e.g. the logical algorithm discussed above that includes a formula for normalized weights). Typically, a range of possible weighted values forms a scale. A second series of steps establishes levels of association 315 between Avatars (e.g. as described for the AR categories above), and then establishes a rating adjustment 325 for each level of association. These rating adjustments may be arranged in a table that lists each association level and corresponding rating adjustment.

These two series of steps are then combined to develop a mapping 335 between the weighted indicia values 330 and the levels of association 315. Typically, this mapping partitions the scale of possible weighted values so that each partition in the sequence corresponds to a level of association in a corresponding sequence of the levels of association 315, with exceptions being made to accommodate other factors included in the weighting logic (e.g. a "close association" is inferred if each Avatar appears on the other's "friends list"). As a result of the mapping 335, application of the weighting logic 330 to any pair of Avatars, based on available information to describe the association between two Avatars, will result in a mapping to one of the established levels of association 315. By application of the rating adjustment table 325, the level of association determined by the mapping 335 of the weighting logic 330 as applied to a particular pair of Avatars will also determine the applicable rating adjustment.

The indicia may have simple binary characteristics (e.g. the Avatars are, or are not, controlled by the same user) that are either present or not, and the combining logic may be a simple addition, as describe above for a virtual world having ten binary indicia of association. However, as those skilled in the art will appreciate, individual indicia may be characterized by a more complex value structure, and the logic for combining the indicia may also be more complex. For example, indicia may include the number of prior rating's given to one Avatar by the other, or the number of times (or the amount of time) that two Avatars have been present in the same virtual world environment, and these indicia may have more complex relationships with other indicia and with the established levels of association between Avatars.

Typically, the rating adjustment logic will be developed and concluded 345 on the basis of a current status and operation of the VU. However, the rating adjustment logic is subject to review and revision at any time it is evaluated 340 as not being complete. For example, the rules of the VU may be modified, or additional information regarding operation of the VU may be developed, prompting further cycles of development of the rating adjustment logic.

This association between the established levels of association 315 and the weighting logic 330, as determined by the mapping 335, can then be used to apply an adjustment (as determined from the table 325) when an Avatar provides a rating to another Avatar. This adjustment will depend upon the rating system. Since the concept of the invention is to apply the rating adjustment to an existing rating system, the result of the adjustment must accommodate any boundary conditions that limit the value assigned to the rating. As an example, if the highest rating of another Avatar is a +4 in the host rating system, this value may be reduced in correlation to the degree of association between Avatars in order to lessen the affect of "friend" Avatars exchanging ratings with one another. The manner of making the reduction must accommodate the rating constraints of the host system, and should also take account of the rating given by the rating Avatar.

In the simplest application of the invention, the rating depends only upon the level of association (i.e. the Association Relativity or "AR") between the rating and receiving Avatars. Table 1 below is an example of an implementation which adjusts the rating by applying a rating based on the level of association A.R.

TABLE 1

AR Adjusted Ratings

| Association: | Rating: |
| --- | --- |
| AR = Close | +1 |
| AR = Moderate | +2 |
| AR = Loose | +3 |
| AR = None | +4 |

Table 1 assumes a host rating system allowing rating values between "+1" and "+4". Rating adjustments may also take account of the rating given, for example, by reducing the rating by a percentage that increases with an increasing level of association. As will be appreciated by those skilled in the art, the rating adjustment could also be expressed as a matrix instead of a simple table, varying by both AR and rating given. All such variations in implementation provide a counter-weight to rating system "gaming" by Avatars who are closely associated with one another.

Application of the Association Relativity (AR) logic to an existing Avatar.rating system is shown in FIG. 3B. A given rating 350 of one Avatar by another is identified 355. Using the indicia of association 320 identified as shown in FIG. 3A, available information is used to determine 360 the values of these indicia for the rating Avatar vis a vis the rated Avatar. Then, using the weighting logic 330 developed as shown in FIG. 3A, a weighted value 365 of the indicia is calculated for the two Avatars. Then, using the mapping 335 developed as shown in FIG. 3A, the weighted indicia value 365 is mapped 370 to determine the level of association between the two Avatars. Once the level of association is determined, the rating adjustment table 325 developed as shown in FIG. 3A is used to determine the applicable rating adjustment, which is then applied 375 to the given rating 350 to produce an adjusted rating 380. The adjusted rating 380 is then stored in database 390 and combined in accordance with the rules of the underlying rating system to produce a revised composite rating. If there is another rating 385 to be adjusted the process is repeated.

In one embodiment, giving or receiving a rating would change the AR between Avatars. As an example, if Avatar1 and Avatar2 are initially found to be not associated (AR=None), upon providing or receiving a rating the association between them would increment to "AR=Loose." An additional exchange may result in an "AR=Moderate." In this way, Avatars providing and/or receiving multiple ratings to/from other Avatars are quickly escalated to more appropriate AR values.

Rating Fee Relativity (FR):

This weighting factor would have to do with the fee paid by one Avatar to give a rating to another Avatar. In Second Life®, only a single fee exists. However, by expanding this system to include a multi-tier fee structure more weight can be given to an Avatar rating based on payment of a higher fee. As an example, if an Avatar chooses to rate another Avatar on "behavior," perhaps the rating Avatar would have multiple choices depending on the amount of fee paid. Table 2 below depicts a possible embodiment of a fee chart, in currency units of "$L". Note that each fee price point provides a higher rating/fee ratio than each lower price point.

TABLE 2

Fee Adjusted Ratings

| Fee Paid: | Rating: |
| --- | --- |
| $L 5 | +.05 |
| $L 10 | +.09 |
| $L 25 | +.4 |
| $L 50 | +1 |
| >$L 50 | +1 |

In this example, the Avatar can give anything from ¹⁄₂₀th of a rating point, to a full rating point based on the fee paid to provide the rating. The lower fees would allow even Avatars with limited funds to express their views, while the higher fees provide more rating weight per unit fee, and would be associated with a stronger showing of appreciation. This weighting structure would discourage a strategy of using repeated ratings to abuse the rating system.

Quantitative Relativity (QR):

This weighting factor ties closely to the FR rating and provides protection against abuse. As an example, in order to maximize an exchange of ratings, two Avatars may agree to provide each other with four ratings of +1/2 each, resulting in total fees of $L 40 each, and an accumulation of 2 rating points each. Allowing multiple rating exchanges such as this undermines the intent of the rating system and fee structure. Addition of QR logic in this invention resolves this problem by throttling multiple ratings, and adjusting rating values based on rating frequency. Table 3 below is an example of QR adjusted rating points. Note that for each column (<1Day, <5 Days) the rating/fee ratio for any fee paid is higher than for any lesser fee paid. Also note that the shorter the time since the last rating (<1 Day, <5 Days) the lower the rating. These rating adjustment principles may be implemented with variation for other fee structures and other selections of elapsed time between ratings.

TABLE 3

QR Adjusted Ratings

| Fee Paid: | Rating: | <1 Day | <5 Days |
|---|---|---|---|
| $L 5 | +.05 | +.02 | +.03 |
| $L 10 | +.09 | +.05 | +.07 |
| $L 25 | +.4 | +.2 | +.3 |
| $L 50 | +1 | +.5 | +.7 |

In this example, when Avatar1 provides Avatar2 with a fee based $L 10 rating, Avatar2 accumulates 0.09 points. If Avatar1 rates Avatar2 again within 24 hours, the same $L 10 fee will result in only 0.05 rating point accumulation by Avatar2. This is simply an example of the underlying logic whereby immediate additional ratings are reduced in value and over specified periods of time, increment up to the original rating value. This would eliminate the ability to "cheat the system" and quickly build positive rating values for'Avatars.

Additionally, using this system, pattern recognition could be used to detect and prevent rating cheats much more readily. If, for example, an Avatar is receiving a 0.09 rating from another Avatar every 6 days, a lowest cost attempt at build up of rating points is likely occurring.

Finally, one may wish to limit both the number of exchanged ratings and the time period between ratings. As an example, Avatar1 may be restricted to rating Avatar2 four times per year, and may be prohibited from providing a second rate within thirty days of the first.

Rating System Based on Combined Relativity:

in a preferred embodiment, the rating system algorithm would incorporate each of the relativity modules: AR, FR, and QR. In other embodiments, each of the relativity modules could be used individually or in pair combinations. Whether the described relativity modules are used individually, in pairs, or all together, this approach enhances, expands upon, and improves existing Avatar rating systems and discourages or prevents the undermining of the rating system intent.

Non-Social Rating System:

The disclosure thus far has focused on existing social, instant behaviors where it is not a problem that the rating Avatar does not closely know the Avatar being rated. Certain individual events are easy to rate, such as doing something in public that is not allowed, or using bad words during a chat. But many activities cannot be rated unless there is a relationship between the Avatars. Such a relationship is necessary to determine ongoing behavioral patterns, generosity, tendency to lose temper, ability to get a job done on time and within budget. These characteristics would not be reliably rated or have value if the rating Avatar does not have a relationship with the Avatar being rated. Thus, non-social rating characteristics may be appropriate in a business environment where the Avatars represent employees who know one another. In such an environment business value can be attained within the rating system. Such rating categories could include things like responsiveness, on time performance, quality of work, and so forth.

It should also be noted that the algorithm for non-social ratings would likely differ from that of social ratings. As an example, a work related rating from a complete stranger may or may not be valid, whereas no relationship is necessary for an Avatar to judge a social circumstance and provide a rating. Modification of the social rating system may be made such that the highest value ratings for work categories may come from co-workers or customers of the employer. Additionally, such ratings may have more value if the work related parties are not found to be socially related.

VU to VU Rating System:

Another feature of future rating systems will be the ability to provide ratings between disparate virtual worlds. As this forum becomes increasingly popular, it is important that interoperability exists such that an Avatar in one virtual world can see and affect the rating of an Avatar in a disparate virtual world. As no such standards currently exist, initial implementation of this feature would likely include the use of an API or external service. Monetary conversion would be required for rating fee processing as well, and again would likely be accomplished initially via an API or service.

Figure 4:
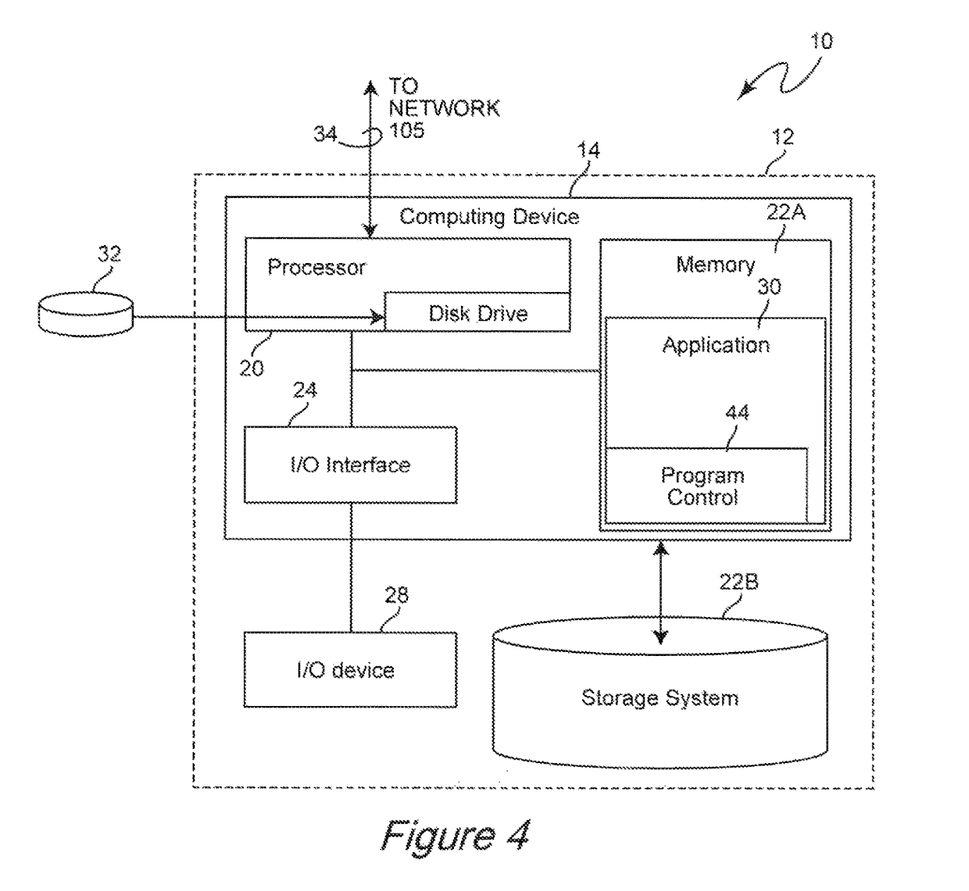
FIG. 4 illustrates a suitable processor architecture for use as a server or client in FIG. 1.

While shown and described herein as a method and a system, it is understood that the invention further provides various alternative embodiments. For example, in one embodiment shown in FIG. 4, the invention provides a computer-readable/useable medium 22B that includes computer program code to enable a computer infrastructure to administer ratings by one Avatar of another Avatar. To this extent, the computer-readable/useable medium includes program code that implements each of the various functions and process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Further, computer infrastructure 10 is intended to demonstrate that some or all of the components of implementation could be deployed, managed, and serviced by a service provider who offers to implement, deploy, and/or perform the functions of the present invention for making interactions between virtual entities more lifelike, for example by licensing methods and browser or application server technology according to the present invention to an interne service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for making interactions between virtual entities more lifelike, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to one skilled in the art are intended to be included within the scope of the invention as defined by the accompanying claims.

While the invention has been described in terms of preferred embodiments, those skilled in the art will recognize that the invention can be practiced with modification within the spirit and scope of the appended claims.

What is claimed is:

1. A computer implemented method for improving accuracy of avatar ratings in a virtual universe, the computer performing the steps of:
    identifying a particular rating given by one avatar to another avatar;
    determining a rating adjustment for said particular rating, the rating adjustment offsetting mutual rating collusion between said one avatar and said another avatar, said rating adjustment being taken from a table, the table being constructed by performing the further steps of:
        combining a plurality of indicia of association between said one avatar and said another avatar in accordance with a weighting logic, the combination forming a scale of values;
        mapping each of a plurality of levels of association between said one avatar and said another avatar to corresponding partitions of said scale of values to form a table;
        assigning a rating adjustment to each said level of association on the table;
        applying said weighting logic to said indicia of association determined from available information between said one avatar and said another avatar and locating a corresponding partition of said scale on said table to select a corresponding rating adjustment;
        establishing a rating fee schedule, lower fees corresponding to lower fractional values of said rating adjustment;
    applying the rating adjustment selected from the table to the particular rating given by said one avatar to said another avatar; and
    displaying with a graphical user interface the adjusted rating to users and avatars operating in the virtual universe.

2. The method as recited in claim 1, wherein the rating adjustment determination step further comprises:
    measuring a level of association between said avatars, higher levels of association being indicative of higher levels of collusion; and
    establishing a rating adjustment that reduces a value of the given rating, the reduction being greater for higher levels of association.

3. The method as recited in claim 2, wherein the measuring step further comprises:
    identifying indicia of association between avatars;
    determining a weighting logic for combining the indicia into a weighted indicia value; and
    mapping said weighted indicia value to a level of association, a higher weighted indicia value being indicative of a higher level of association.

4. The method as recited in claim 3, wherein a scale of weighted indicia values is partitioned into a sequence of value ranges, each of said partitions being mapped to a level of association, the levels of association being arranged in a corresponding sequence.

5. The method as recited in claim 4, the sequence of levels of association comprising the set: closely associated; moderately associated; loosely associated; and not associated.

6. The method as recited in claim 1, wherein said fractional value rating adjustments are further reduced for shorter delays between the rating and a prior rating between said avatars, the shorter the delay the greater the reduction.

7. A computer implemented system for improving accuracy of avatar ratings in a virtual universe, said computer implemented system comprising a processor and a computer readable storage medium having program instructions embodied therewith, the program instructions, when executed by the processor, causing the processor to perform a method comprising:
    identifying a particular rating given by one avatar to another avatar;
    determining a rating adjustment for said particular rating, the rating adjustment offsetting mutual rating collusion between said one avatar and said another avatar, said rating adjustment being taken from a table, the table being constructed by
        combining a plurality of indicia of association between said one avatar and said another avatar in accordance with a weighting logic, the combination forming a scale of values;
        mapping each of a plurality of levels of association between said one avatar and said another avatar to corresponding partitions of said scale of values to form a table;
        assigning a rating adjustment to each said level of association on the table;
        applying said weighting logic to said indicia of association determined from available information between said one avatar and said another avatar and locating a corresponding partition of said scale on said table to select a corresponding rating adjustment;
        establishing a rating fee schedule, lower fees corresponding to lower fractional values of said rating adjustment;
    applying the rating adjustment selected from the table to the particular rating given by said one avatar to said another avatar; and
    displaying using a graphical user interface the adjusted rating to users and avatars operating in the virtual universe.

8. The system as recited in claim 7, wherein the program instructions comprise further instructions which, when executed by the processor, cause the processor to further perform within the step of determining a rating adjustment:
  measuring a level of association between said avatars, higher levels of association being indicative of higher levels of collusion; and
  establishing a rating adjustment that reduces a value of the given rating, the reduction being greater for higher levels of association.

9. The system as recited in claim 8, wherein the program instructions comprise further instructions which, when executed by the processor, cause the processor to further perform within the step of measuring:
  identifying indicia of association between avatars;
  determining a weighting logic for combining the indicia into a weighted indicia value; and
  mapping said weighted indicia value to a level of association, a higher weighted indicia value being indicative of a higher level of association.

10. The system as recited in claim 9, wherein a scale of weighted indicia values is partitioned into a sequence of value ranges, each of said partitions being mapped to a level of association, the levels of association being arranged in a corresponding sequence.

11. The system as recited in claim 10, the sequence of levels of association comprising the set: closely associated; moderately associated; loosely associated; and not associated.

12. The system as recited in claim 7, wherein said fractional value rating adjustments are further reduced for shorter delays between the rating and a prior rating between said avatars, the shorter the delay the greater the reduction.

13. A server having software modules stored thereon and having a processor operable to execute the software modules to improve accuracy of avatar ratings in a virtual universe, the software modules comprising computer code that, when executed by the processor, cause the processor to perform a method comprising:
  identifying a particular rating given by one avatar to another avatar;
  determining a rating adjustment for said particular rating, the rating adjustment offsetting mutual rating collusion between said one avatar and said another avatar, said rating adjustment being taken from a table, the table being constructed by:
    combining a plurality of indicia of association between said one avatar and said another avatar in accordance with a weighting logic, the combination forming a scale of values;
    mapping each of a plurality of levels of association between said one avatar and said another avatar to corresponding partitions of said scale of values to form a table;
    assigning a rating adjustment to each said level of association on the table;
    applying said weighting logic to said indicia of association determined from available information between said one avatar and said another avatar and locating a corresponding partition of said scale on said table to select a corresponding rating adjustment;
    establishing a rating fee schedule, lower fees corresponding to lower fractional values of said rating adjustment;
  applying the rating adjustment selected from the table to the particular rating given by said one avatar to said another avatar; and
  displaying with a graphical user interface the adjusted rating to users and avatars operating in the virtual universe.

14. The server and software modules as recited in claim 13, wherein said computer code, when executed by the processor, further cause the processor, when determining a rating adjustment, to perform steps of:
  measuring a level of association between said avatars, higher levels of association being indicative of higher levels of collusion; and
  establishing a rating adjustment that reduces a value of the given rating, the reduction being greater for higher levels of association.

15. The server and software modules as recited in claim 14, wherein said computer code, when executed b he processor, further cause the processor, when measuring a level of association, to perform steps of:
  identifying indicia of association between avatars;
  determining a weighting logic for combining the indicia into a weighted indicia value; and
  mapping said weighted indicia value to a level of association, a higher weighted indicia value being indicative of a higher level of association.

16. The server and software modules as recited in claim 15, wherein a scale of weighted indicia values is partitioned into a sequence of value ranges, each of said partitions being mapped to a level of association, the levels of association being arranged in a corresponding sequence.

17. The server and software modules as recited in claim 16, the sequence of levels of association comprising the set: closely associated; moderately associated; loosely associated; and not associated.

18. An apparatus for providing an avatar rating accuracy improvement service, comprising:
  a database configured to store ratings given by one avatar to another avatar;
  a software module for determining a rating adjustment to be applied to a particular rating given by said one avatar to said another avatar, the rating adjustment offsetting mutual rating collusion between said one avatar and said another avatar, said rating adjustment being taken from a table;
  a processor configured to execute the software module causing the processor to construct the table by combining a plurality of indicia of association between said one avatar and said another avatar in accordance with a weighting logic, the combination forming a scale of values;
  mapping each of a plurality of levels of association between said one avatar and said another avatar to corresponding partitions of said scale of values to form a table;
  assigning a rating adjustment to each said level of association on the table;
  applying said weighting logic to said indicia of association determined from available information between said one avatar and said another avatar and locating a corresponding partition of said scale on said table to select a corresponding rating adjustment;
  establishing a rating fee schedule, lower fees corresponding to lower fractional values of said rating adjustment;
  wherein the software module, when executed by the processor, further causes the processor to perform steps of applying the rating adjustment selected from the table to the particular rating given by said one avatar to said another avatar; and
  displaying with a graphical user interface the adjusted rating to users and avatars operating in the virtual universe.

19. An apparatus for providing an Avatar rating service as recited in claim 18, wherein the rating adjustment is based upon a level of association between said avatars, higher levels of association being indicative of higher levels of collusion, the value of a given rating being reduced a greater amount for higher levels of association.

20. An apparatus for providing an Avatar rating service as recited in claim 18, wherein the software module, when executed by the processor, further causes the processor to perform steps of
   identifying indicia of association between avatars;
   determining a weighting logic for combining the indicia into a weighted indicia value; and
   mapping said weighted indicia value to a level of association, a higher weighted indicia value being indicative of a higher level of association.

21. An apparatus for providing an Avatar rating service as recited in claim 20, wherein the scale of weighted indicia values is partitioned into a sequence of value ranges, each of said partitions being mapped to a level of association, the levels of association being arranged in a corresponding sequence.

22. An apparatus for providing an Avatar rating service as recited in claim 21, wherein the sequence of levels of association comprise the set: closely associated; moderately associated; loosely associated; and not associated.

* * * * *